June 3, 1969  M. L. GOFF  3,448,366
MULTIPHASE STATIC INVERTER
Filed Nov. 28, 1966  Sheet 1 of 3

INVENTOR
MILTON L. GOFF
BY

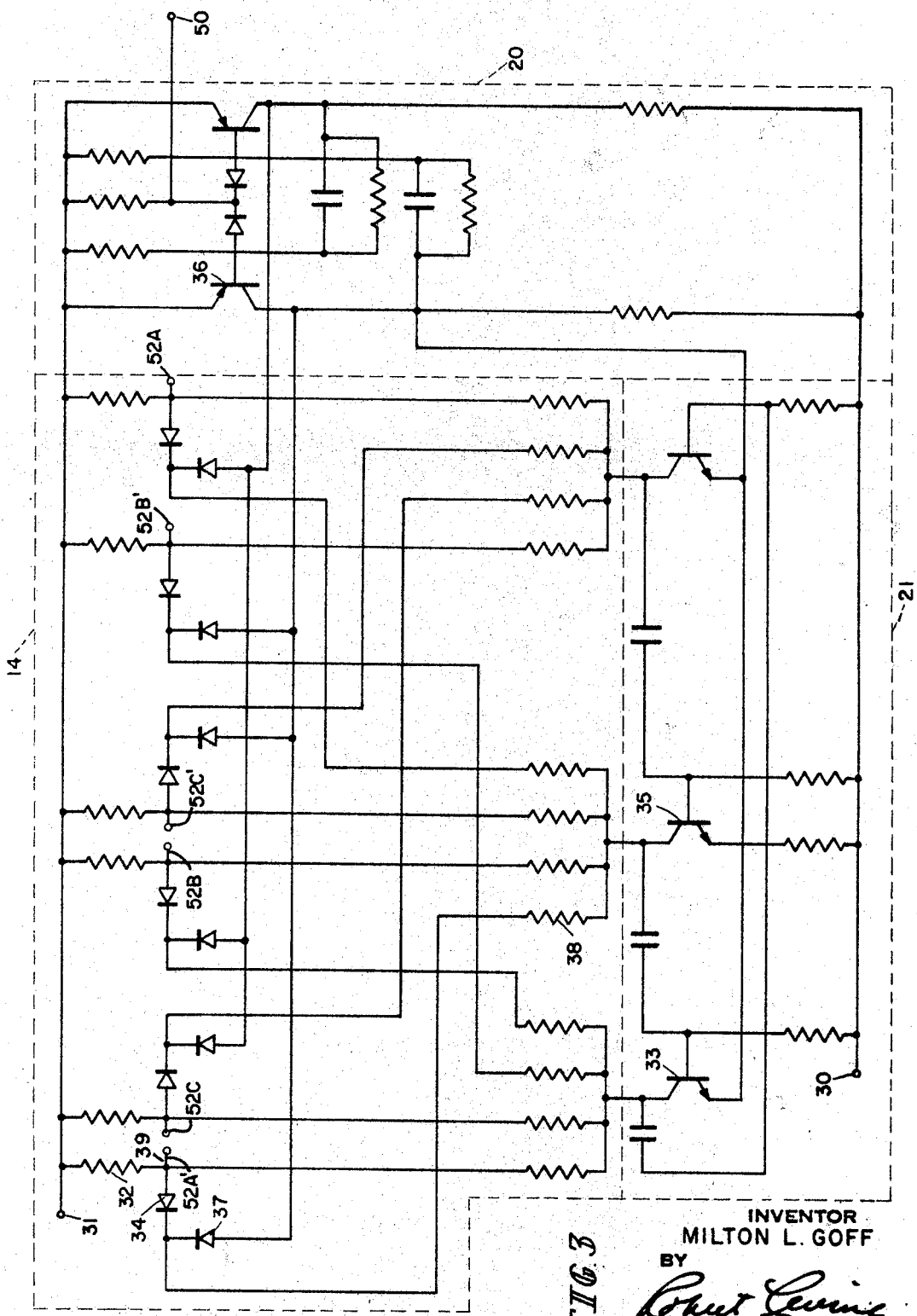

United States Patent Office 3,448,366
Patented June 3, 1969

3,448,366
MULTIPHASE STATIC INVERTER
Milton L. Goff, Anaheim, Calif., assignor to P. R. Mallory & Co., Inc., Indianapolis, Ind., a corporation of Delaware
Filed Nov. 28, 1966, Ser. No. 597,260
Int. Cl. H02m 7/52
U.S. Cl. 321—5    8 Claims

ABSTRACT OF THE DISCLOSURE

A multiphase static inverter including a DC power source, a phase-locked control unit which produces a plurality of control signals maintained in proper phase relationship to each other and to a power unit which converts the DC power to multiphase AC power in response to the control signals. The phase-locked control unit includes a frequency standard having a determined frequency output, a digital multiphase generator modifying the output of the frequency standard thereby providing a set of multiphase signals phase-locked to a sub-multiple of the output of the frequency standard and a logic network which combines the multiphase signals to provide the plurality of control signals. The multiphase generator includes a flip-flop driven by the frequency standard and has two output signals of opposite phase and a ring counter driven by one of the flip-flop output signals and providing a plurality of equally-spaced pulses which substantially correspond to the number of phases of the AC output power. The logic network is driven by the flip-flop output signals and by the ring-counter pulses.

---

The present invention relates to electrical power converters, and particularly relates to improvements in direct-current to alternating-current (DC-AC) multiphase static inverters.

With the increasing availability of high-current semiconductor switching devices, the static inverter finds an ever greater range of applications in areas once dominated by electro-mechanical rotary inverters. The chief advantages of the static inverter are its small size and weight and its high reliability in a variety of environments. There are, however, several major advantages still retained by the rotary inverter. One of these is the inherent stability of the relative displacement of the output phases from each other under conditions of large loads and unbalance in the phase loads; another is the higher purity of the AC output wave, which becomes important in many applications.

The equality of time displacement among the phase voltages of conventional multiphase static inverters is degraded by various conditions existing in the phase loads and within the inverter itself. This degradation takes the form of serious distortion of the AC output waveform, large circulating currents and other undesirable effects; it leads to restrictions upon the various phase loads, inefficiency of the inverter and to the necessity for a larger-capacity inverter to handle a given set of loads than would otherwise be required. It is accordingly a primary object of this invention to present a multiphase static inverter in which the AC output waves are phase-locked to each other, thus maintaining the proper relative displacement of the output voltages under all conditions of operation.

Since the power transistors of a static inverter operate in the switching mode rather than in the linear mode, their control signals need not be an accurate representation of the desired AC output waveform; it is only required that the timing of the control signals be correct. Thus, it is not only possible but also desirable for the control circuits of the power transistors to be of a non-resonant digital nature; that is, wherein the operation of the circuits does not vary with the frequency of the signals. It is another object of the present invention to provide a phase-locked inverter having simple and efficient control circuits by the use of digital techniques.

The AC waveform of a static inverter is a square wave because of the switching action of the power transistors. This square wave has a high content of harmonics of the desired AC output frequency, resulting in a lowered efficiency of the inverter and in its unsuitability for use with loads requiring low-distortion AC power. Although the undesired harmonics can be filtered out by known methods, such filtering demands bulky components and further decreases the efficiency of the inverter. The inverter of the present invention ameliorates this situation by combining several of the phase-locked instantaneous output voltages into a step approximation of a sine wave which has a much lower distortion than does a square wave. Furthermore, the harmonics which do appear in the output of the present inverter are of a high order, which are easier to filter than are low-order harmonics.

The individual square waves which constitute the step approximation must have a certain relative amplitude, phase displacement and duration. If the correct values are not stably enforced under all conditions, distortion of the AC output will increase; in some cases, unbalanced DC power will appear across the transformer windings, leading to the production of damaging heat in the transformers and to loss of efficiency and reliability. It is a feature of the present invention that the step aproximation does not vary with load conditions on the inverter.

Although the step-approximating process can be carried out either before or after the raw square wave power passes through the transformers of the inverter, it is a further object of the present invention to provide a simple method for increasing the efficiency of the power transformers by accomplishing the appproximation before the AC power enters the transformers.

Further objects and advantages of the present invention, as well as changes and modifications within the scope of the appended claims, will become apparent to one skilled in the art from the following description of a preferred form of the invention taken in conjunction with the accompanying drawings in which:

FIGURE 3 is a circuit diagram showing a realization of the control unit of FIGURE 2;

Figure 1:
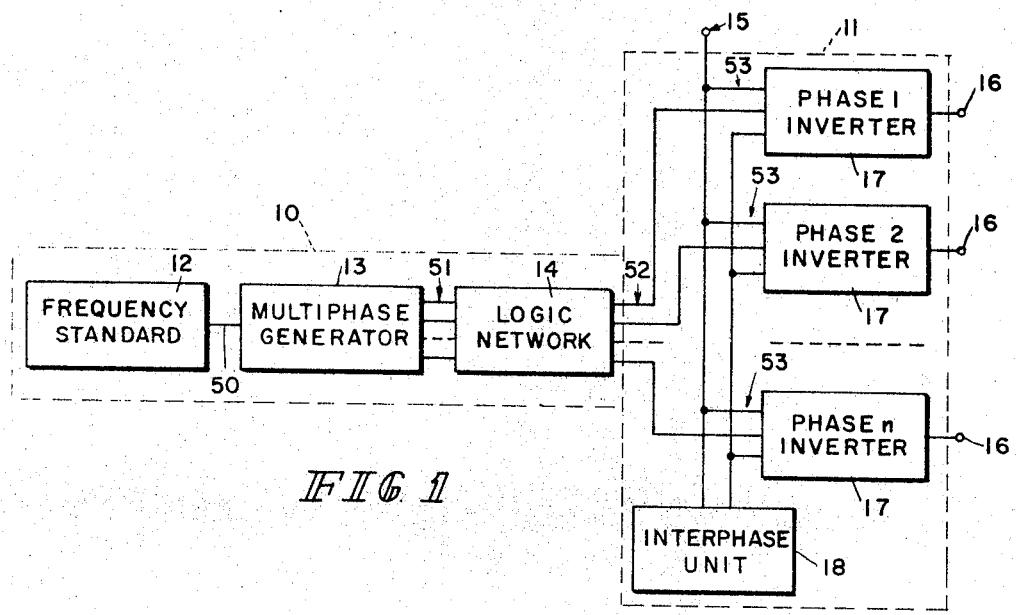
FIGURE 1 is a block diagram of a preferred embodiment of the invention.

Referring more particularly to FIGURE 1, it will be seen that the multiphase static inverter generally comprises a source 15 of DC power, a phase-locked control unit 10 for producing a plurality of control signals 52 fixedly maintained in proper phase relationship to each other and a power unit 11 for the conversion of DC power into multiphase AC power in response to the control signals 52.

Within the control unit 10, a frequency standard 12 generates a stable output 50 having a predetermined frequency. The signal 50 is fed into a multiphase generator 13, whose output signals 51 contain waves each having the repetition rate of the desired AC power frequency, but separated from each other in phase by an equal amount. The signals 51 are next combined with each other in a logic network 14 in order to obtain phase-locked control signals 52 having the proper duration and timing for driving the power unit 11.

The power unit 11 utilizes the control signals 52 to convert DC power from a source 15 into multiphase AC power at the outputs 16 by means of a plurality of phase inverters 17. An interphase unit 18 performs the step approximation function indicated previously. Accessories such as output waveform filters and voltage regulators (not shown) may be added to the inverter of FIGURE 1 in a conventional manner.

FIGURE 1 shows the outlines of an inverter embodying the concepts of the present invention for an arbitrary number of output phases and for an arbitrary frequency. For clarity in illustrating these concepts, a common type of inverter, producing three-phase power at 400 Hz., is shown in FIGURES 2 through 5. It will be understood, however, that the particular inverter to be described may easily be modified to yield a different number of phases at a different frequency.

Figure 2:
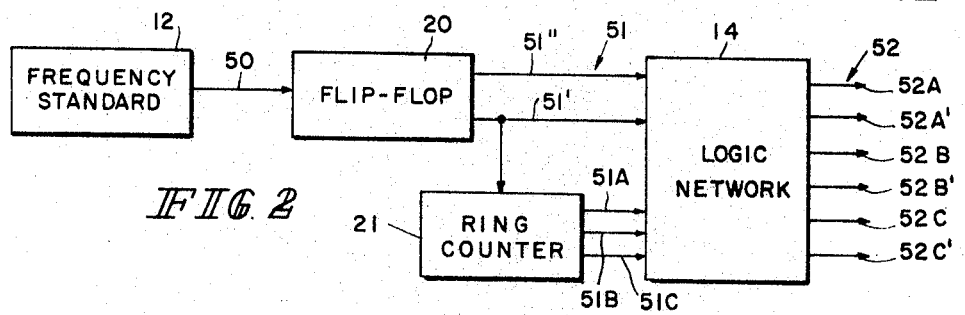
FIGURE 2 is a block diagram of a control unit for a three-phase inverter according to the invention.
Figure 5:
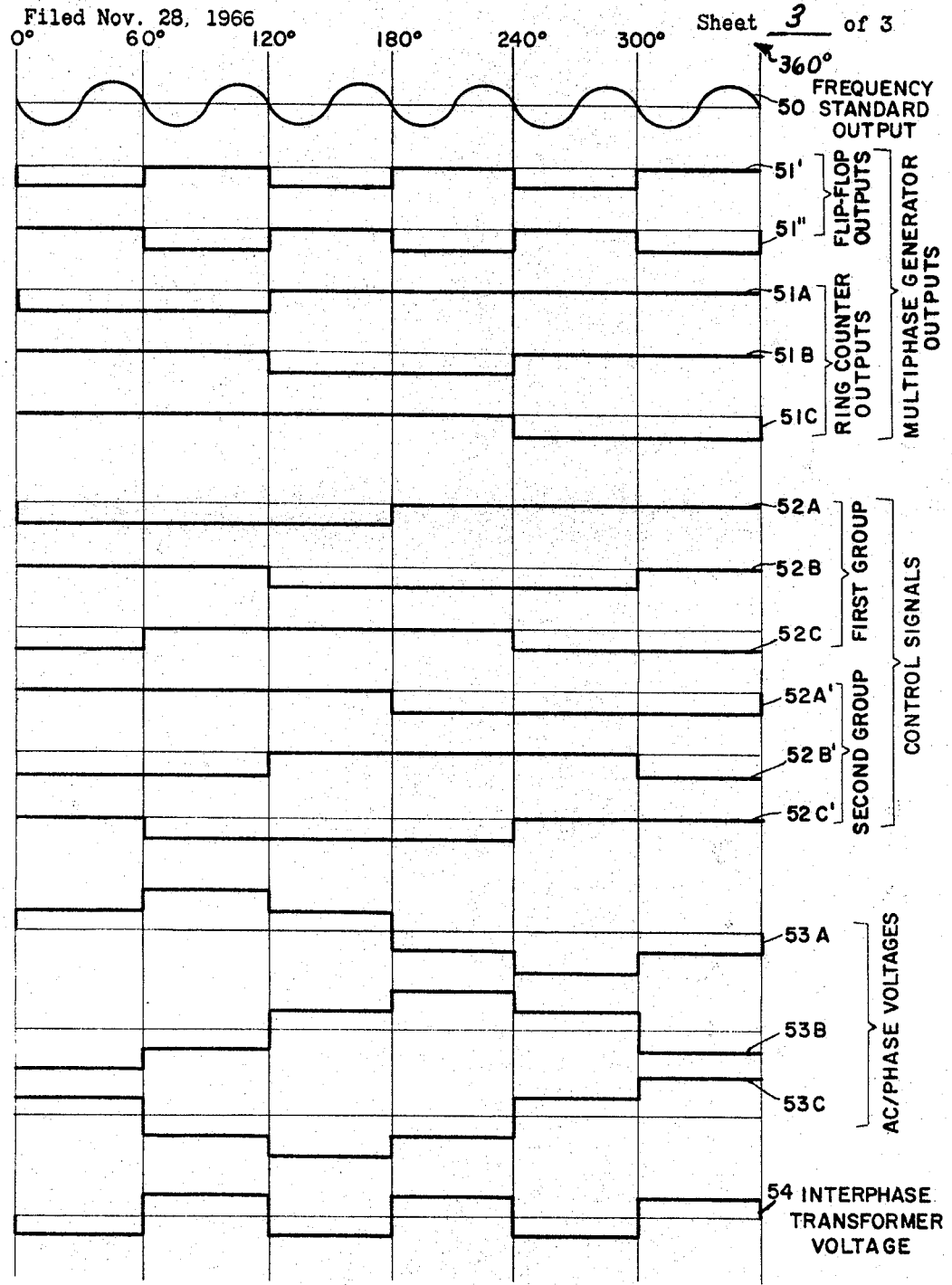
FIGURE 5 is a representation of the waveforms occurring at various points in FIGURES 2, 3 and 4.

Referring to FIGURE 2 in conjunction with the waveforms of FIGURE 5, it will be seen that the multiphase generator 13 consists of a flip-flop 20 driven by a 2400 Hz. signal 50 from the frequency standard 12 and a ring counter 21 driven by one signal 51′ from the flip-flop. The flip-flop output signals 51′ and 51″, forming a first set of outputs, are 1200 Hz. square waves of opposite phase; the ring counter output signals 51A, 51B and 51C, forming a second set of outputs, are identical, equally spaced pulses having a repetition rate of 400 Hz. Thus the flip-flop 20 and ring counter 21 together form a bi-tertiary type of digital counter; this scheme calls for fewer components than would, for instance, a standard six-stage ring counter used alone. Referenced to the phase angles of one complete cycle of an AC output wave, then, the signals 51′ and 51‴ have pulse lengths of 60° spaced at 120° intervals and are 60° out of phase with respect to each other; the signals 51A, 51B and 51C have pulse lengths of 120° spaced at 360° intervals and are separated from each other by 120° of phase. It will be appreciated that the signals 51 are immutably locked together at specified submultiples of the frequency of the signal 50 by the use of non-resonant digital circuits, so that their relative phases cannot be altered by load conditions on the inverter outputs.

The phase inverters 17, however require control signals 52 spaced 120° apart and having a duration of 180°; i.e., three-phase symmetrical square waves. Furthermore, each inverter 17 requires two signals oppositely phased with respect to each other; that is, it is required to have two mutually oppositely phased groups of three-phase control signals. Such signals, collectively designated as 52, are provided by the logic network 14. In practice, each of the signals 52 is obtained in one of the logic circuits of the network 14 by adding two adjacent 120° ring-counter pulses and subtracting from one of these 120° pulses at 60° flip-flop pulse. Logical systems for obtaining some other odd number of phases from signals having the characteristics of the pulses 51 can be constructed similarly; systems for obtaining an even number of phases are even simpler.

FIGURE 3 shows circuitry for a realization of a three-phase control unit 10. The flip-flop 20 and ring counter 21 shown are in themselves conventional. The wires 31 supply operating voltages to the control unit. Taking the signal 52A′ as an example, it will be seen that current will flow through the load resistor 32 whenever transistor 33 conducts, i.e., during the interval from 240° to 360°; additionally, the diode 34 will allow current to flow through the resistor 32 when transistor 35 conducts (120° to 240°), except when transistor 36 also conducts (120° to 180°), at which latter time current flows through diode 37 and resistor 38 to prevent the conduction of the diode 34. Thus, the required 180°-duration pulse 52A′ can be obtained at point 39 of the logic network 14. The remaining control signals 52 are similarly constructed and are obtained at the points indicated in FIGURE 3.

Figure 4:
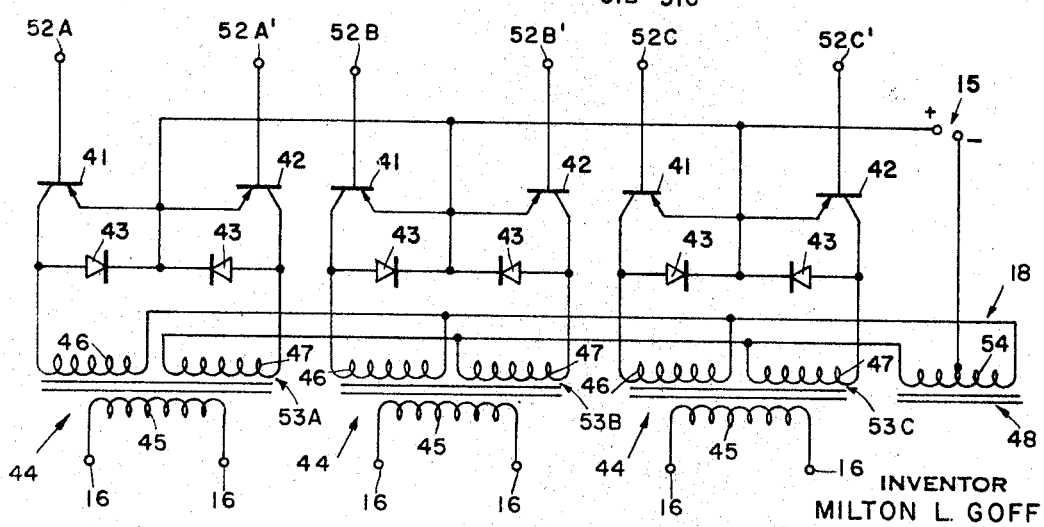
FIGURE 4 is a circuit diagram of a power unit for a three-phase inverter according to the invention.

The power unit 11, the details of which are shown in FIGURE 4, includes one inverter unit 16 for each phase of the AC output power. The inverter units 17 are identical, each consisting of two power transistors 41 and 42, a pair of reverse-current protective diodes 43 and a transformer 44 having a secondary winding 45 and two identical primary windings 46 and 47. The emitters of the power transistors 41 and 42 are connected together to one polarity of the DC power source 15; their collectors are connected to the outer ends of the primary windings 46 and 47. The inner ends of the primaries 46 and 47 are tied together across an interphase transformer 48, the midpoint of which is connected to the other polarity of the DC power source 15.

The bases, or control electrodes, of the transistors 41 and 42 are coupled to the control signals 52 as indicated in FIGURE 4. Thus the transistors 41 will each conduct, allowing power to flow in one direction through the primaries 46 and interphase transformer 48, for 180° of the AC output cycle, and the individual transistors 41A, 41B and 41C will conduct 120° out of phase with each other. The transistors 42 will each conduct, allowing power to flow in the opposite direction through the primaries 47 and interphase transformer 48, for 180° of the AC cycle, the individual transistors 42A, 42B and 42C being 180° out of phase with their respective transistors 41A, 41B and 41C and 120° out of phase with each other. The alternate conduction of the transistors 41 and 42 produces alternate pulses of current in opposite directions in the primaries 46 and 47, which induces the AC output voltages in the secondary windings 45.

Since the three transformers 44 are identical, merely connecting together the inner ends of the windings 46 and 47 would result in an instantaneous sum of the output phase voltages which would alternate between positive and negative every 60° of phase, and would further lead to the disadvantages of raw squarewave AC power indicated earlier. The interphase transformer 48, however, simultaneously sums the instantaneous phase voltages to zero and provides a step-approximation to a sine wave in order to increase the efficiency of the inverter. As is illustrated in FIGURE 4, one end of the transformer 48 is connected to the inner ends of the windings 46, while the other end of the transformer 48 is connected to the inner ends of the windings 47; the transformer 48 is tapped at its midpoint and connected to one terminal of the DC power source 15. At any time during the cycle of the AC output power, there will be two transformers 44 carrying current in a first direction and one transformer 44 carrying current in the opposite direction. The voltage across each half of the interphase transformer 48, however, is proportional to the current flowing in that half. Thus the voltage across two transformers 44 will each be equal to one-half the voltage across the third transformer 44, the transformer output voltages then being similarly related. The resulting waveforms are designated 53A, 53B and 53C in FIGURE 5; the 1200 Hz. waveform in the interphase transformer 48 is shown as 54.

The six equal-duration steps used over a complete cycle, the amplitudes and durations of which steps have been determined by the desirable and simple expedient of summing the phase voltages to zero, can be shown by Fourier analysis to be a good approximation to a sine wave. More specifically, the lowest harmonic to appear in the waveforms 52 is the fifth (or, more generally, the $n-1$, where $n$ equal-duration steps are used), the third harmonic having been converted into available fundamental-frequency power, whereby the efficiency of the inverter is increased. Harmonics which are even or which are multiples of three are absent, and each of the remaining harmonics has a relative magnitude approximately equal to the inverse of its ordinal number. The importance of proper timing and duration of the approximating steps, achieved herein by a simple, stable, phase-locked method, can also be seen from the Fourier series. It is usually the case that harmonics of the AC power are not useful in, or even deleterious to, the load devices to be connected to the inverter; although harmonics can be filtered out of the inverter output, their power is obviously wasted thereby, and additional bulky components are necessary to perform the filtering. The present phase-locked step approximation increases the efficiency of the inverter by converting a larger fraction of the DC power into AC of the desired fundamental frequency and greatly decreases the need for filtering. The harmonics which do appear are constant in number and amplitude regardless of the loads on the inverter, allowing an optimum design for any filter which may still be required. Furthermore, the lowest harmonic appearing in the output is far removed from the fundamental frequency, resulting in a much smaller filter and allowing greater attenuation of the harmonics without significant losses at the fundamental frequency.

The step-approximation process could of course be carried out in the secondary circuits of the transformers 44, instead of in their primary circuits as has been done here. Power transformers, however, are designed for operation at or near a specific frequency; at other frequencies, internal losses increase due to eddy currents, hysteresis, heating of the windings and other factors. Therefore, another advantage of the step approximation, peculiar to the method described herein, is that the approximated sine wave is produced at the primary windings of the transformers 44, rather than allowing square-wave power with its high harmonic content first to pass through the transformers and thereby to decrease their efficiency. The interphase transformer 48 operates only at a multiple of the AC output frequency, and consequently can be designed specifically for this higher frequency; its size and weight can also be reduced, since, within limits, high-frequency transformers are smaller and lighter than low-frequency transformers of the same power capability.

I claim as my invention:

1. A multiphase static inverter comprising a source of DC power; a phase-locked control unit for producing a plurality of control signals fixedly maintained in proper phase relationship to each other including a frequency standard having an output at a predetermined frequency, a digital multiphase generator operating upon said frequency-standard output to produce at least one set of multiphase signals phase-locked to at least one submultiple of said predetermined frequency, and a logic network for combining selective ones of said multiphase signals to form said plurality of control signals; said multiphase generator includes a flip-flop driven by said frequency standard and having two output signals of mutually opposite phase and a ring counter driven by one of said flip-flop output signals and producing a plurality of identical, equally-spaced pulses corresponding to the number of phases of said AC output power, and wherein said logic network is driven by said flip-flop output signals and by said ring-counter pulses; and a power unit for conversion of said DC power into multiphase AC power in response to said control signals.

2. A three-phase static inverter according to claim 1 wherein said multiphase generator is a digital bi-tertiary counter having a first set of outputs at one-half of said predetermined frequency and a second set of outputs at one-sixth of said predetermined frequency, and wherein said logic network comprises six logic circuits, each of said logic circuits providing one of said control signals by a combination therein of a selected one of said second-set outputs with a combination of a selected one of said first-set outputs and another selected one of said second-set outputs.

3. A multiphase static inverter according to claim 1 wherein said power unit comprises a plurality of phase inverters, each of said phase inverters converting said DC power into one phase of said multiphase AC power in response to selected ones of said control signals, and an interphase unit coupled to said phase inverters for summing the instantaneous voltages of all phases of said AC power to zero.

4. A multiphase static inverter according to claim 3 wherein said interphase unit, in summing the instantaneous voltages of all of said phase voltages to zero, also imparts to each of said phase voltages the form of a step-approximated sine wave.

5. A multiphase static inverter according to claim 4 wherein each of said phase inverters includes a transformer having at least one primary winding, and wherein said interphase unit is operative to produce said step-approximated sine waves within said primary windings.

6. A multiphase static inverter according to claim 3 wherein said control signals comprise two mutually oppositely phased groups of multiphase signals, and wherein each of said phase inverters comprises a transformer having first and second primary windings, and a pair of transistors connected between said primary windings and said DC power source, said transistors having control electrodes coupled to oppositely phased ones of said control signals.

7. A multiphase static inverter according to claim 6 wherein each of said phase inverters further comprises a pair of reverse-current protective diodes connected across said transistors.

8. A multiphase static inverter according to claim 6 wherein said interphase unit comprises an interphase transformer having a winding with first and second ends and a tap therebetween, said first end being connected to said first primary winding, and said second end to said second primary winding, of each of said phase-inverter transformers, and said tap being connected to said DC power source, whereby voltages in the form of step-approximated sine waves are produced in said primary windings.

References Cited

UNITED STATES PATENTS

| | | | |
|---|---|---|---|
| 2,239,437 | 4/1941 | Bedford. | |
| 3,002,142 | 9/1961 | Jensen | 321—9 |
| 3,060,363 | 10/1962 | Jensen | 321—5 |
| 3,200,321 | 8/1965 | Rosenstein | 321—3 |
| 3,321,693 | 5/1967 | Heinrich et al. | 321—5 |

JOHN F. COUCH, *Primary Examiner.*

W. H. BEHA, JR., *Assistant Examiner.*

U.S. Cl. X.R.

307—225